US012547976B1

(12) United States Patent
Puri et al.

(10) Patent No.: US 12,547,976 B1
(45) Date of Patent: Feb. 10, 2026

(54) RESOURCE UTILIZATION BASED-MODELING

(71) Applicant: Amazon Technologies, Inc., Seattle, WA (US)

(72) Inventors: Sourabh Puri, Bellevue, WA (US); Jennifer Cowles, Mt. Juliet, TN (US); Yimin Liu, Bellevue, WA (US); Gunjan Gupta, Noida (IN); Nitin Birdi, Nabha (IN); Suvam Biswal, Cuttack (IN); Kira Faith Jones, Nashville, TN (US)

(73) Assignee: Amazon Technologies, Inc., Seattle, WA (US)

( * ) Notice: Subject to any disclaimer, the term of this patent is extended or adjusted under 35 U.S.C. 154(b) by 456 days.

(21) Appl. No.: 18/075,754

(22) Filed: Dec. 6, 2022

(51) Int. Cl.
*G06Q 10/087* (2023.01)
*G06Q 10/047* (2023.01)

(52) U.S. Cl.
CPC ......... *G06Q 10/087* (2013.01); *G06Q 10/047* (2013.01)

(58) Field of Classification Search
CPC .................. G06Q 10/087; G06Q 10/047
See application file for complete search history.

(56) References Cited

U.S. PATENT DOCUMENTS

| 2015/0254589 | A1* | 9/2015 | Saxena | G06Q 10/06315 705/7.25 |
| 2017/0283185 | A1* | 10/2017 | Gorski | B65G 1/1378 |
| 2023/0385471 | A1* | 11/2023 | Du | G06F 30/12 |

FOREIGN PATENT DOCUMENTS

CA  3059365 A1 * 10/2018 ........... G06Q 10/087

* cited by examiner

*Primary Examiner* — A. Hunter Wilder
*Assistant Examiner* — Joseph M Mutschler
(74) *Attorney, Agent, or Firm* — Kilpatrick Townsend & Stockton LLP

(57) ABSTRACT

Improved resource utilization based-modeling is described herein. In an example, a computer system receives layout data indicating a layout of storage areas, staging areas, and material handling equipment configured to move items to at least the storage areas. The computer system receives first association data indicating staging area-to-delivery resource associations and second association data indicating item-to-delivery resource associations corresponding to items to be delivered. The computer system generates an input to a model based on the layout data, the first association data, and the second association data. The computer system determines an output of the model based on the input. The output is generated by the model based on a storage area-to staging area travel distance minimization. The output indicates a distribution of the items across the storage areas. The computer system causes a device to present, in a user interface, the layout and the distribution based on the output.

20 Claims, 11 Drawing Sheets

RESOURCE UTILIZATION BASED-MODELING

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment.

BRIEF DESCRIPTION OF THE DRAWINGS

Various embodiments in accordance with the present disclosure will be described with reference to the drawings, in which.

DETAILED DESCRIPTION

Figure 1:
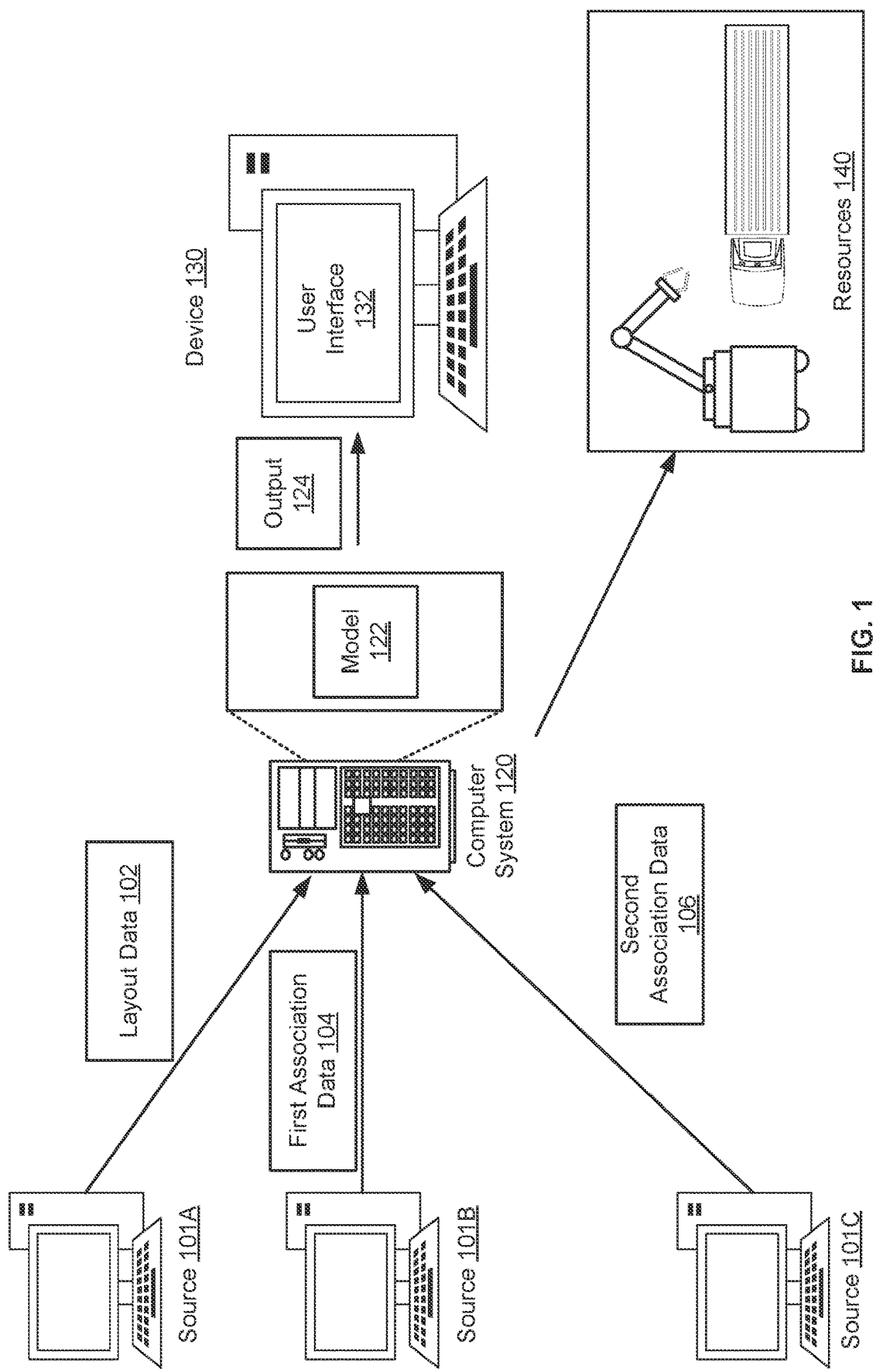
FIG. 1 illustrates an example of a system for resource utilization based-modeling according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, utilizing resources in an item handling environment. In an example, a computer system receives layout data indicating a layout of storage areas, staging areas, and material handling equipment (e.g., conveyor belts, chutes, pipes, etc.) configured to move items to the storage areas. The computer system receives first association data indicating staging area-to-delivery resource associations and second association data indicating item-to-delivery resource associations corresponding to items to be delivered. Each delivery resource may be associated with one staging area. The computer system generates an input to a model based on the layout data, the first association data, and the second association data. The computer system determines an output of the model based on the input. The output is generated by the model based on a storage area-to staging area travel distance minimization. The output indicates a distribution of the items across the storage areas. That is, the output can indicate in which storage spaces of storage areas items are to be stored to minimize a travel distance between the storage areas and the staging areas. The computer system causes a device to present, in a user interface, the layout and the distribution based on the output. The computer system may additionally cause a deployment of facility resources based on the output.

To illustrate, consider an example of a storage facility that has systems configured to receive items at material handling equipment, transfer the items to storage areas, and picks the items from the storage areas for moving to staging areas for outbound transportation. A computer system determines a particular number and arrangement of storage areas, that particular delivery resources are associated with particular staging areas, and that particular items are to be transported from particular staging areas. The computer system inputs this data into a model that determines how the items are to be distributed across the storage areas to minimize the travel distance between the storage areas and the staging areas. The distribution can then be displayed by a user interface, which can allow a user to visualize the distribution and request updates to aspects of the distribution.

Embodiments of the present disclosure provide various technological advantages. For example, by using layout data and delivery resource associations, better resource allocations can be achieved to handle the items (e.g., stow or pick). Because of the improved resource allocation, a higher throughput of the storage facility becomes possible. In addition, a user interface displays results of the modeling so that a user may visualize the improvements to the distribution of items and resources. The user interface can also provide a means for the user to simulate changes to the facility or to provide feedback to the model. As a result, updates to the facility can be made and/or updates to the model can be made, which in turn can improve the overall resource utilization, efficiency, and throughput.

FIG. 1 illustrates an example of a system for resource utilization based-modeling according to embodiments of the present disclosure. In an example, a computer system 120 receives layout data 102 from a source 101A, which is illustrated as being computer devices in FIG. 1. The layout data 102 can indicate a layout of storage areas, staging areas, and material handling equipment of a facility. The storage areas can each include a number of storage spaces. The staging areas can be locations within the facility in which a delivery resource (e.g., a truck or other entity for performing an transportation of items from the facility) receives items that are to be delivered by the delivery resource. The material handling equipment may be conveyor belts, robots, chutes, pipes, etc. for moving items (e.g., a package or a container of multiple packages) to the storage areas. The computer system 120 may cause a device 130 to present the layout of the facility in a user interface 132.

In an example, the computer system 120 can also receive first association data 104 and second association data 106 from sources 101B-C. The first association data 104 can indicate staging area-to-delivery resource associations. For instance, the first association data 104 may indicate that a first delivery resource is associated with a first staging area and a second delivery resource is associated with a second staging area. The second association data 106 can indicate item-to-delivery resource associations. The items can correspond to items that are to be delivered. So, the second association data 106 may indicate that a first set of items is associated with the first staging area and a second set of items are associated with the second staging area.

The computer system 120 generates an input to a model 122 based on the layout data 102, the first association data 104, and the second association data 106. The model 122 may be a mixed integer linear programming model, a machine learning model, or an artificial intelligence model for minimizing a travel distance associated with moving items from the storage areas to the staging areas. Other possible optimization parameters for the model 122 may be a minimization of a total travel distance for a package on material handling equipment, a minimization of a travel time associated with moving items from storage areas to staging areas, a minimization of a number of used resources (e.g., associates and robots), etc. An output 124 of the model can indicate a distribution of the items across the storage areas. The distribution can include a per item allocation to a storage space of a storage area. The output 124 can additionally indicate that a staging area is associated with a delivery resource and that a portion of a storage area is to store items associated with the staging area and/or the delivery resource. The output 124 can indicate a storage space of the staging area that is to store each item. As used herein, an item can be a container that contains a set of objects, or an uncontained object itself.

In an example, the computer system 120 causes the device 130 to present an update to the layout that indicates the distribution in the user interface 132. The layout in the user interface 132 may include an indication that a particular staging area is associated with a particular delivery resource and another indication of the portion of the storage area that is to store the items or is associated with the staging area and/or the delivery resource. In addition, the device 130 can present an indication of the storage space in which each item is to be stored on the layout in the user interface 132.

The computer system 120 may additionally cause resources 140 of the facility to be deployed based on the output 124. For instance, the computer system 120 may cause an operation of a conveyor belt or an operation of a facility resource (e.g., associate, robot, etc.) to move an item from the conveyor belt onto a storage area or from the storage area to a staging area. The computer system 120 may generate a deployment plan based on the output 124 and then cause the deployment of the resources 140 based on the deployment plan. Delivery resources may also be deployed based on the output 124.

Figure 2:
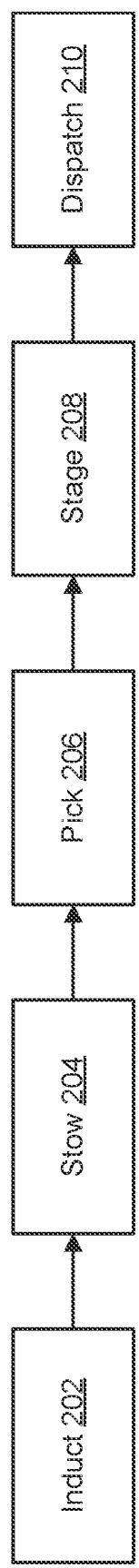
FIG. 2 illustrates stages for preparing items for delivery in a facility according to embodiments of the present disclosure.

FIG. 2 illustrates stages for preparing items for delivery in a facility according to embodiments of the present disclosure. During an induct stage 202, packages are received by a facility for processing. During a stow stage 204, packages are grouped into containers and bags based on a storage area to which the packages are going. The containers and bags are then placed in storage spaces of a storage area, such as on shelves of a grid that makes up the storage area. Then, during a pick stage 206, containers and bags from multiple storage spaces are grouped together to form a route for delivery. The grouped containers and bags are also placed on a cart to be moved to a staging area during a staging stage 208. In a dispatch stage, a delivery resource picks their assigned routs from their associated staging area and places the routes in their vehicle for delivery.

Figure 3:
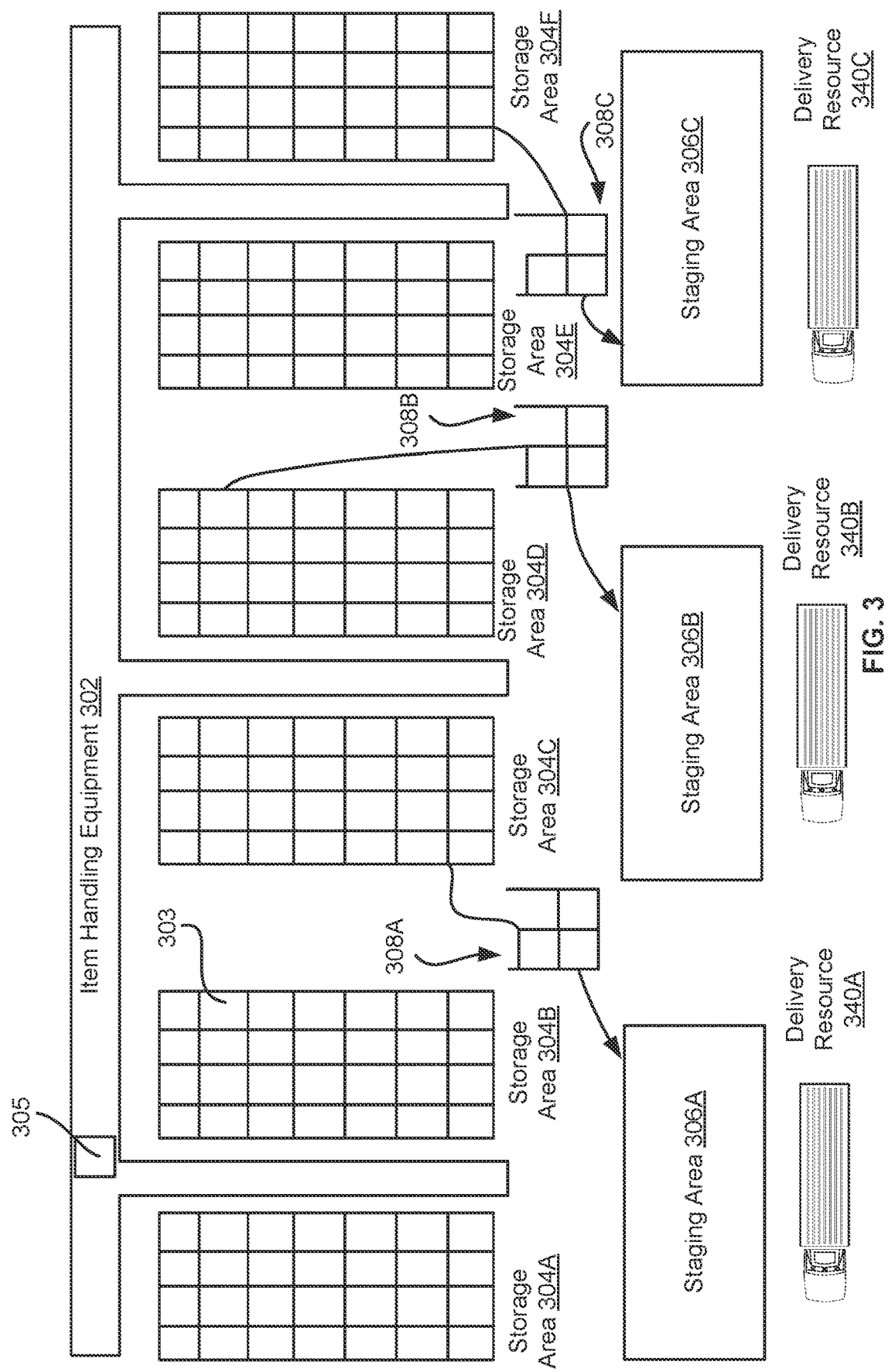
FIG. 3 illustrates an example of material handling equipment, storage areas, and staging areas of a facility using resource utilization based modeling.

FIG. 3 illustrates an example of material handling equipment, storage areas, and staging areas of a facility using resource utilization based modeling. Aspects of FIG. 3 are described with respect to the stages of FIG. 2. Without using resource utilization based-modelling, facility resources may be allocated and used suboptimally. For instance, items 305 may be received during the induct stage 202 and then stowed in storage areas 304A-F during the stow stage 204. The items 305 can be moved to storage spaces 303 of the storage areas 304A-F by item handling equipment 302, which is illustrated in FIG. 3 as being conveyor belts. The items 305 for a delivery that is to be performed by a particular delivery resource 340 are picked during the pick stage 206 into groups 308 of items for a delivery. So, a group 308 may include one or more items 305. The groups 308 are then transported (e.g., by an associate or a robot) to a staging area 306 during the staging stage 206. The staging area 306, to which a group 308 is transported to can depend on the delivery resource 340 that is performing a delivery of the items 305 in the group 308 since each delivery resource 340 is associated with a particular staging area 306. The delivery resource 340 for a delivery then receives the group 308 from the staging area 306 and is deployed for the delivery.

As illustrated in FIG. 3, three groups 308A-C of items 305 are being transported to the staging areas 306A-C for delivery by the delivery resources 340A-C. Group 308A is picked from storage spaces 303 of storage area 304C and then transported by a facility resource to staging area 306A for delivery by delivery resource 340A. In addition, group 308B is picked from storage spaces 303 of storage area 304D and then transported by a facility resource to staging area 306D for delivery by delivery resource 340D. Group 308C is picked from storage area 304F and then transported by a facility resource to staging area 306C for delivery by delivery resource 340B.

The distribution of the items 305 to the storage spaces and the storage areas 304 to the staging areas 306 can be based on the layout of the facility, staging area-to-delivery resource associations, and item-to-delivery resource associations. A computer system (e.g., computer system 120 in FIG. 1) can receive the layout of the facility, staging area-to-delivery resource associations, and item-to-delivery resource associations, input these features into a model, and receive an output of the distribution from the model. The output can minimize a travel distance between the storage areas 304A-F and the staging areas 306A-C, as illustrated in FIG. 3.

Figure 4:
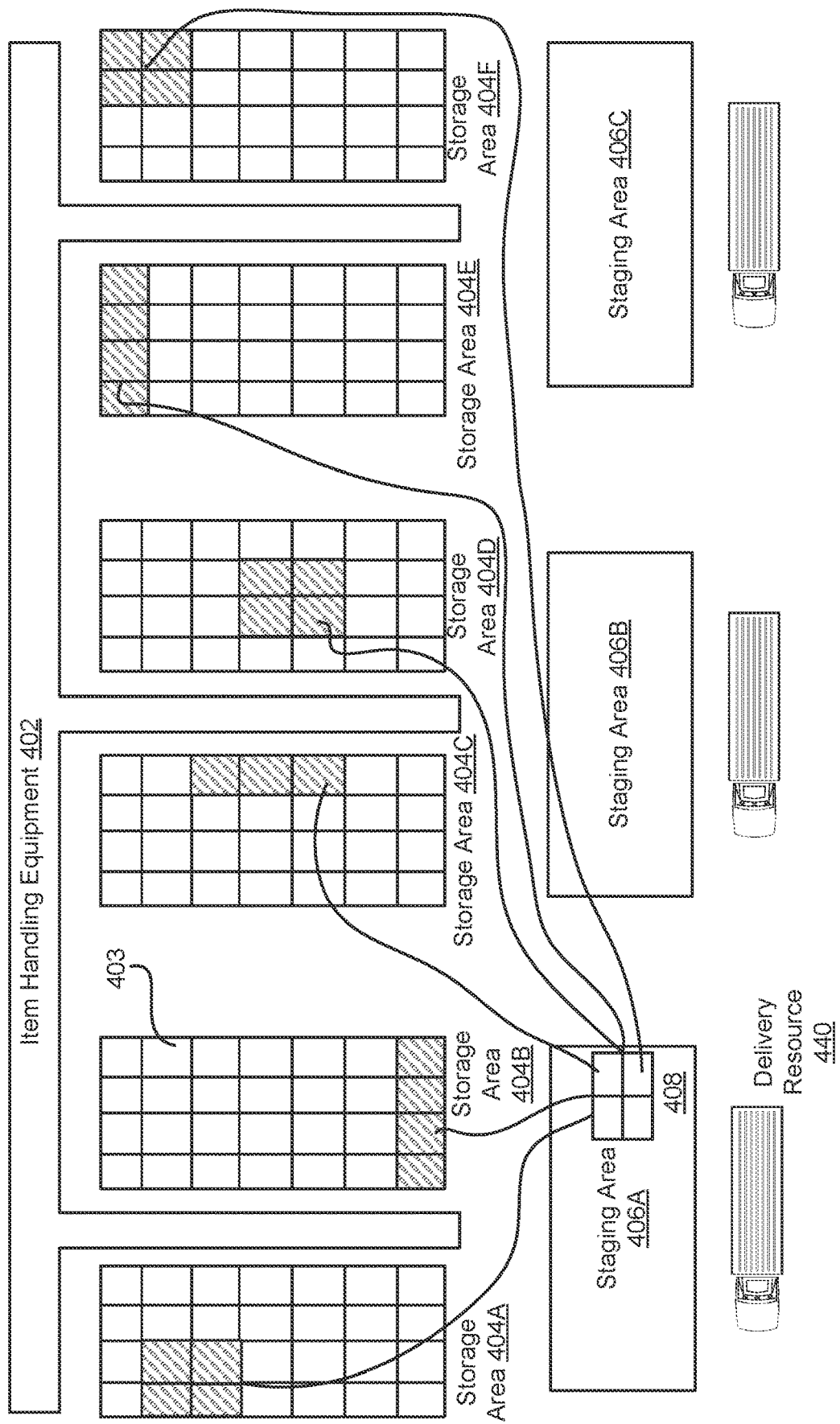
FIG. 4 illustrates an example of storage spaces of storage areas storing items for a delivery according to some embodiments of the present disclosure.

FIG. 4 illustrates an example of storage spaces of storage areas storing items for a delivery according to some embodiments of the present disclosure. Similar to FIG. 3, items 405 in FIG. 4 are transported to storage spaces 403 of storage areas 404A-F by material handling equipment 402. The staging area 406 for a delivery resource 440 may be fixed so that the same delivery resource 440 receives items from the same staging area 406 each time. So, to minimize a travel time and distance for a facility resource to collect items for delivery by the delivery resource 440 from the storage areas 440A-F, the items 405 can be distributed in the storage areas 404A-F to be close to their staging area 406.

Items 405 for a delivery can be placed anywhere in the storage areas 404A-F, as shown in FIG. 4, where each of the patterned storage spaces 403 corresponds to an item for a delivery that is to be performed from the staging area 406A by the delivery resource 440. Depending on where they are placed in the storage areas 404A-F, the facility resource may travel different lengths and the time taken to travel from the storage areas 404A-F to the staging area 406A can be different. For instance, the items 405 gathered from the storage spaces 403 of the storage area 404B may travel the shortest distance to reach the staging area 406A. Thus, using resource utilization based-modeling, the items 405 can be optimally distributed in the storage spaces to minimize the travel distance between the storage areas 404A-F and the staging areas 406A-C for deliveries.

Stow rate may be directly impacted by facility resource allocation and item distribution amongst storage areas. A poor item distribution and facility resource allocation can result in a reduced stow rate. Picking rate may be directly impacted when volume of a delivery resource is split across multiple and far away storage spaces. When a delivery resource's volume is split across multiple and far away storage spaces, a facility resource has to travel from one area of storage spaces to another during picking. In addition, staging time may be impacted directly by the path a facility resource travels during picking and staging. The path taken by the facility resource can depend on the storage space from where the item is picked from and the staging area for the item. Thus, using a computer system (e.g., computer system 120 in FIG. 1) to determine a distribution of items to storage spaces and staging areas can minimize the travel distance between the storage areas 404A-F and the staging areas 406A-C. Thus, resources may be more optimally utilized, which can result in a higher throughput for the facility, since a stow rate, pick rate, and stage rate may all be improved by using the output of the model.

Figure 5:
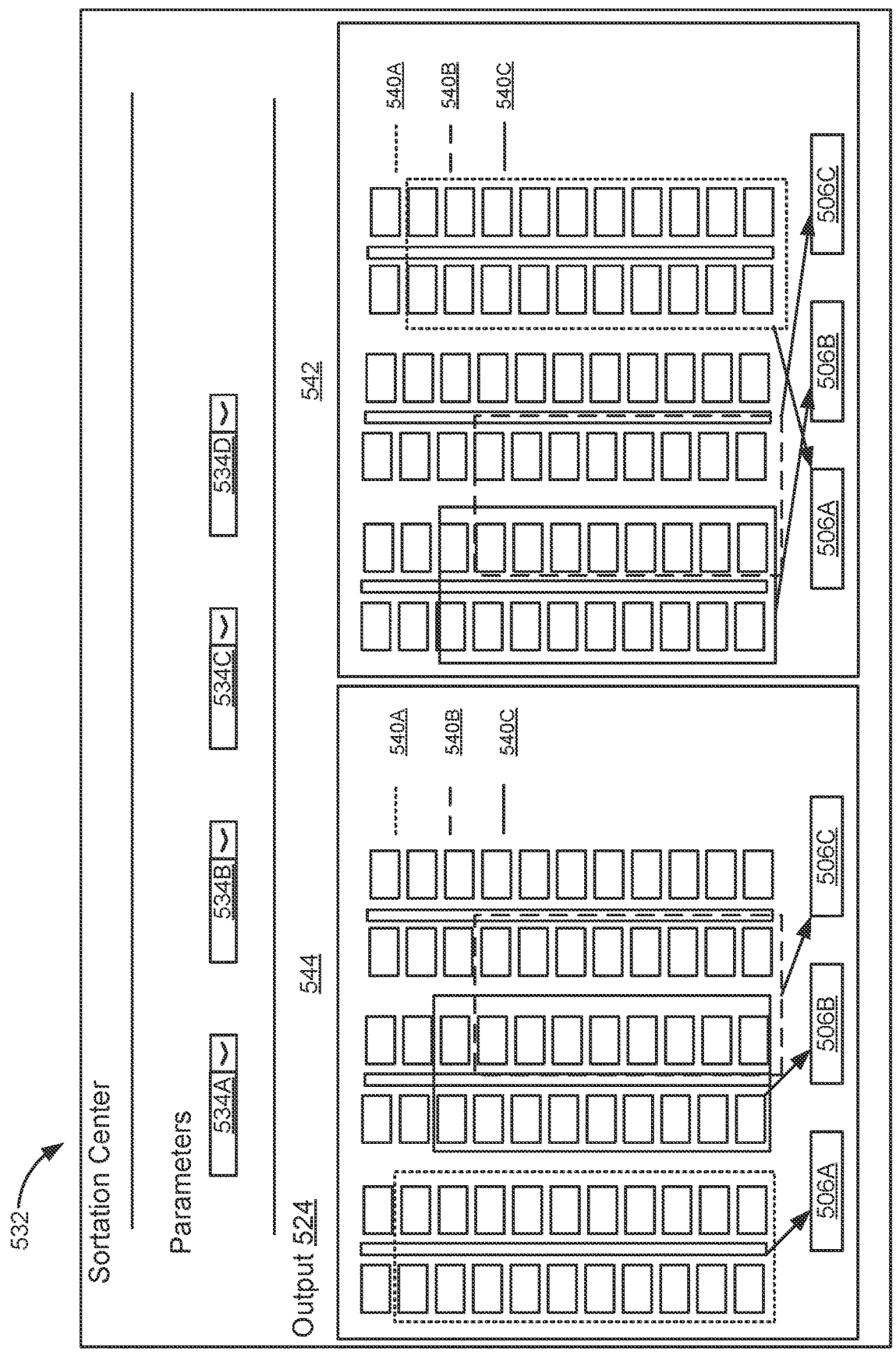
FIG. 5 illustrates a user interface for resource utilization based-modeling according to some embodiments of the present disclosure.

FIG. 5 illustrates a user interface 532 for resource utilization based-modeling according to some embodiments of the present disclosure. A computer system (e.g. computer system 120 in FIG. 1) performing the resource utilization based-modeling may cause a device (e.g., device 130 in FIG. 1) to present the user interface 532. The user interface 532 can enable user interactions (e.g., to provide inputs and receive outputs) with a model hosted by the computer system (e.g., a program code for the model 122 of FIG. 1). The user interface 532 can display an output 524 that includes an initial distribution 542 of a facility and a generated distribution 544 of the facility. In the initial distribution 542, the user interface 532 displays the layout of the facility and indications of how storage areas of the facility are associated with staging areas 506A-C of the facility, where each of the staging areas 506A-C is associated with a delivery resource 540A-C. As illustrated, delivery resource 540A is associated with staging area 506A, which is positioned on an opposite side of the facility from the storage areas that store items that are delivered by the delivery resource 540A. In addition, delivery resource 540B is associated with staging area 506C and delivery resource 540C is associated with staging area 506B, and neither of these associations utilize the shortest distance between storage areas and staging areas.

The computer system can input layout data and association data (e.g., first association data 104 and second association data 106 in FIG. 1) of the facility into a model to generate the generated distribution 544. For instance, in the generated distribution 544, delivery resource 540A is still associated with staging area 506A, delivery resource 540B is still associated with staging area 506B, and delivery resource 540C is still associated with staging area 506C. But, the storage areas associated with a staging area are different in the generated distribution 544 than those in the initial distribution 542. For each staging area 506A-C, the storage areas associated with the staging area 506A-C are closer to the staging area 506A-C than in the initial distribution 542, resulting in a reduced travel distance from the storage areas to the staging areas 506A-C when moving items for a delivery. Within each storage area, the storage space(s) associated with a particular staging area may be indicated on the user interface 532. The presentation of the initial distribution 542 side-by-side with the generated distribution 544 at the user interface 532 can allow for the visualization of the improvements to the distribution of items, storage spaces, and storage areas.

In an example, one or more parameters 534A-D may be included in the input to the model, and the generated distribution 544 can be based on the one or more parameters 534A-D. Data of the parameters 534A-D can be received via the user interface 532 and used by the computer system when generating the output 524 of the generated distribution 544. As an example, parameter 534A may be a prioritization parameter that indicates a priority for using particular storage areas or storage spaces. For instance, the prioritization parameter may specify that a top shelf of a particular storage area has a low priority for item storage. Prioritization data of the prioritization parameter can be input into the model to generate the generated distribution 544. In an example, parameter 534B may be an area density parameter of facility resources. For instance, the area density may indicate that facility resources cannot be within six feet of each other. Area data indicating the area density of facility resources can be input into the model to generate the generated distribution 544. The parameter 534C may be a cycle parameter indicating that items belong to a single inbound item cycle. Cycle data of the cycle parameter resources can be input into the model to generate the generated distribution 544. Any of the parameters 534A-D may be toggled on or off, or otherwise changed (e.g., using a drop-down menu), which can result in the input to the model and the generated distribution 544 being updated.

In an example, once the generated distribution 544 is displayed at the user interface 532, input data may be received via the user interface 532 that indicates a change to the distribution of the items across the storage areas. For instance, the input data may indicate that items have moved from one storage space to another. An operation of material handling equipment may then be caused based on the change to move the items to the new storage space. The input data may additionally or alternatively case an operation of a facility resource to move an item from material handling equipment to a storage space based on the change. In an example, the computer system may generate an update to the model based on the change. The update to the model may involve a change to constraints of the model, a change to inputs of the model, a change to a cost function of the model, etc. In the case of the model being a machine learning model or an artificial intelligence model, the update may involve retraining of the model.

The user interface 532 may additionally be used to simulate various layouts or volumes of items for the facility. For example, the computer system may receive input data indicating a simulated change to the layout (e.g., an addition of a storage area, a removal of a shelf, a rearrangement of the storage areas, etc.), a total number of items to be stored, or a type of items to be stored. The computer system can then generate an input to the model based on the input data and determine another output that indicates a change to a performance of the facility. For instance, the change to the performance may be a reduced travel distance between storage areas and staging areas. So, the user interface 532 can be used to change a layout of a facility or a distribution of items in the facility. Changing the layout or distribution can then be used as feedback to update the model.

Figure 6:
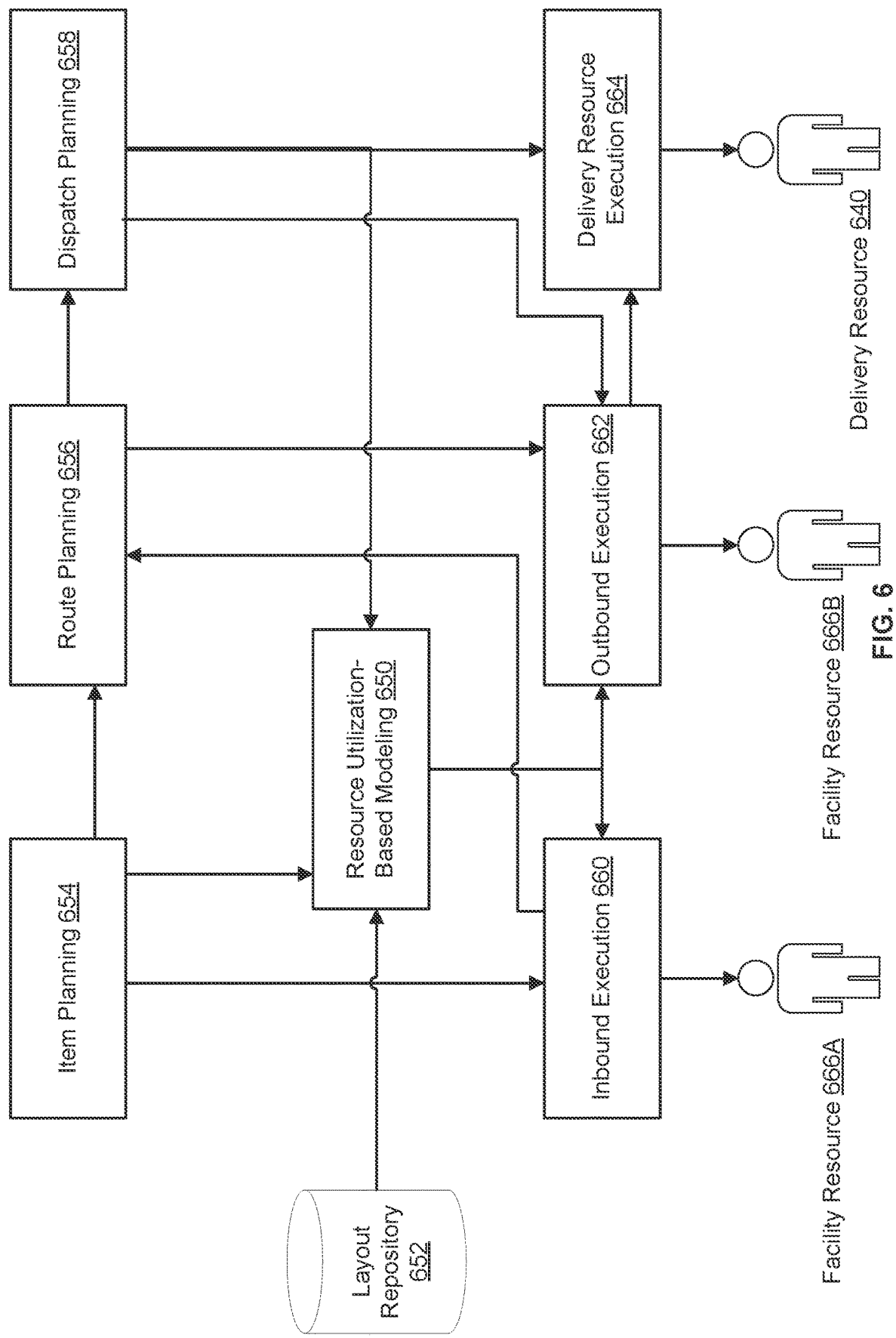
FIG. 6 illustrates an example architecture for resource utilization based-modeling according to some embodiments of the present disclosure.

FIG. 6 illustrates an example architecture for resource utilization based-modeling according to some embodiments of the present disclosure. A resource utilization-based modeling component 650 takes input from different systems to determine the optimal distribution of items in storage areas. The resource utilization-based modeling component 650 receives layout data of a facility from a layout repository 652. The layout data can be used by the resource utilization-based modeling component 650 in determining the placement of items (e.g., packages and/or bags of packages) in the facility. The resource utilization-based modeling component 650 also receives a package-to-item mapping from an item planning component 654 and a delivery resource-to-staging area mapping from a dispatch planning component 658.

Based on the received data, the resource utilization-based modeling component 650 determines an item-to-storage space mapping that can be sent to an inbound execution component 660 that can instruct a facility resource 666A to store the items in the storage spaces. Once the items are stored, the inbound execution component 660 can notify a route planning component 656 that route planning can occur. The route planning component 656 can then receive the package-to-item mapping from the item planning component 654 and determine an item-to-delivery mapping that can be sent to the dispatch planning component 658 and an outbound execution component 668. The dispatch planning component 658 generates a delivery-to-staging area mapping and sends delivery-to-staging area mapping to the outbound execution component 662 and a delivery resource execution component 664. The dispatch planning component 658 may send an indication of a departure time for each delivery resource to the outbound execution component 662 and the delivery resource execution component 664. The dispatch planning component 658 may be part of a dispatch system that receives the output of the resource utilization-based modeling component 650 and plans and deploys resources (e.g., associates, robots, etc.) and calls the delivery resources to the staging area (e.g., from a queuing area). The outbound execution component 662 can instruct a facility resource 666B to place items in a cart and transport the cart with the items to a staging area. The outbound execution component 662 can then notify the delivery resource execution component 664 that a delivery of items is ready for loading the delivery resource execution component 664 can deploy a delivery resource 640 to load and deliver the items.

Figure 7:
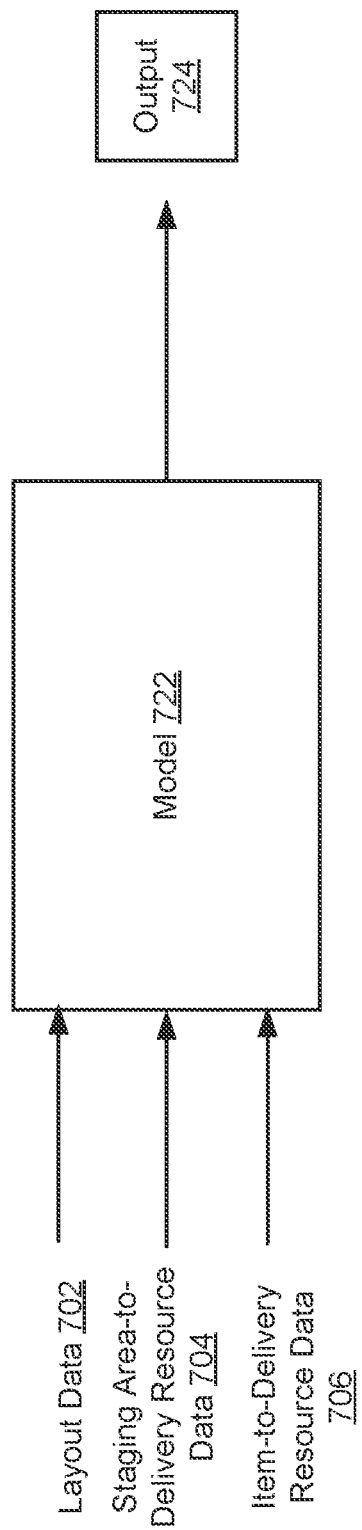
FIG. 7 illustrates an example of a model for resource utilization based-modeling according to some embodiments of the present disclosure.

FIG. 7 illustrates an example of a model 722 for resource utilization based-modeling according to some embodiments of the present disclosure. A computer system (e.g., computer system 120 in FIG. 1) can execute the model 722 to determine an output 724 of a distribution of items in storage areas to minimize a travel distance between the storage areas and staging areas. The computer system can generate an input to the model 722 including layout data 702 of a facility, staging area-to-delivery resource data 704, and item-to-delivery resource data 706. The layout data 702 can indicate a layout of storage areas, staging areas, and material handling equipment of the facility, the staging area-to-delivery resource data 704 can indicate staging area-to-delivery resource associations, and the item-to-delivery resource data 706 can indicate item-to-delivery resource associations. Based on the layout data 702, the input to the model 722 may include a number of available material handling equipment, a capacity per available material handling equipment, a number of available staging areas, a capacity per available staging area, or a travel distance between one of the material handling equipment and one of the staging areas. Based on the staging area-to-delivery resource data 704 and the item-to-delivery resource data 706, the input to the model 722 may include an association between a package and an item to contain one or more packages, an association between the item and a delivery resource, or a number of items associated with the delivery resource. The input to the model 722 may additionally include attributes related to a queuing area where delivery resources are stationed before being dispatched to the staging areas. Each delivery resource can be associated with a particular station in the queueing area from which they travel to their designated staging area. The attributes related to the queuing area can include a layout of the queuing area (e.g., a number and arrangement of stations) and a distance of each station to the associated staging area.

Other inputs may include data about dispatching schedules for delivery resources and staging area preferences for a schedule. This data may include the schedules and preferences and/or embeddings thereof. The dispatching schedules can include a scheduled entry and departure time for a given delivery resource. The schedule outlines when each delivery resource arrives and where the delivery resources will be located within the queueing area. In addition, the dispatching schedules can be based on a wave interval, which is a cycle of delivery resources arriving at the queueing area and departing to the staging areas to respective items. Each wave has a set capacity, and each delivery resource is assigned to a wave. So, the dispatching schedules can indicate the queueing area and the queuing station to which each delivery resource is assigned within each wave. The staging area preferences can include a recommendation of the staging area(s) to be used in association with the dispatch schedule.

In an example, the model 722 may be a machine learning model or a mixed linear integer programming model configured to minimize a total travel distance associated with moving items from storage areas to staging areas. In addition, the model 722 may be configured with an additional objective such as increasing a stow rate, increasing a pick rate, balancing a density of items across the storage areas, preventing item overflows, or reducing a number of used material handling equipment or used storage areas.

The model 722 can generate the output 724 that indicates a distribution of items across the storage areas including a per item allocation to a storage space. The model 722 may have a set constraints such as a volume constraint, a number of items to be handled by one material handling equipment, a grouping of aisles across storage areas, or an area density of facility resources that the output 724 is further based on. In addition, the output 724 may be based on model data indicating an item type, a delivery resource, a delivery vehicle type, or a staging area.

As a particular example, the model 722 can be a mixed linear integer programming model that includes inputs of: a list of delivery resources (D={$D_1$, $D_2$, ... $D_i$}) whose items are to be allocated to storage areas and staging areas, a number of items for each delivery resource (Z={$Z_1$, $Z_2$, ... $Z_i$}), a set of available storage areas (F={$F_1$, $F_2$ ... $F_j$}) in a facility, a maximum item capacity of each storage area (C={$C_1$, $C_2$, ... $C_j$}), a set of "k" available staging areas (S={$S_1$, $S_2$, ..., $S_k$}), a maximum item capacity of each staging area (M={$M_1$, $M_2$ ..., $M_k$}), a travel distance between the $j^{th}$ storage area and the $k^{th}$ staging area ((T={$T_1$, $T_2$ ..., $T_{jk}$}), a cost of using the $j^{th}$ storage area ($K_1$, $K_2$, ..., $K_j$), a number of aisles in a storage area ($N_1$, $N_2$ ..., $N_j$), and item capacity per aisle for a storage area ($A_1$, $A_2$, ..., $A_j$). In addition, a daily delivery per delivery resource forecast for each deliver resource (denoted $SPR_i$ for the $i^{th}$ delivery resource), the packages for each delivery resource (denoted $P_i$ for the $i^{th}$ delivery resource), and the distance between two consecutive aisles (d, assumed to be eight feet) are collected.

Decision variables ($X_{ijk}$) are defined as integer variables with zero as the lower bound and denoting a number of items for delivery resource i allocated to staging area k and storage area j. Other variables may be added to the model 722, such as $\tau_{ij}$ representing if a storage area is opened for the $i^{th}$ delivery resource, $\phi_j$ representing if storage area i is opened, and $\lambda_{ik}$ representing if staging area j is opened for the $i^{th}$ delivery resource.

Throughput of a facility can be broken down stow rate, pick rate, and stage rate. The objective function can consider all three so that the global optima for throughput is reached. Balancing of volume and cost of storage areas opening can be added to the optimization function using:

$$\Sigma_j(\Sigma_{ik}X_{ijk}-\mu_j)^2 + \Sigma_j(a_j+1)*\phi_j$$

where $a_j$ comes from divert rates for each storage area. The limiting of opening storage areas for a delivery resource can be represented by:

$$\Sigma_i\Sigma_j(\Sigma_{ij}-1)$$

in the objective function. The distances from each storage area-staging area combination computed from historical and layout data are used to come up with the total distance function. As the stage time is impacted at the delivery level, a weightage can be added to the distances for different delivery resources depending on the shipments per delivery for each delivery resource. The derived distance function is:

$$\sum_{jk}\left(T_{jk} * \sum_j\left(X_{ijk} * \frac{P_i}{Z_i * SPR_i}\right)\right) + d * \sum_i\left\{\left(\frac{\sum_{jk}X_{ijk}}{A_j}\right) * \left(\frac{\sum_{jk}X_{ijk}}{A_j} + 1\right)\right\}$$

The model 722 can include constraints such as a volume constraint for a delivery resource on a storage area, a maximum number of items per storage area constraint, a delivery resource volume constraint, a using nearby storage areas constraint (binary variables $\tau_{ij}$ where $\tau_{ia}+\tau_{ib}=1$, where a∈[0, j−4]; b>a+4; ∀i delivery resources), and area density constraints. The area density constraints may include a staging area having a maximum of two delivery resources ($\Sigma_i(\lambda_{ik}) \leq 2$, ∀ k), a delivery resource only being in one staging area ($\Sigma_k\lambda_{ik}=1$), and a delivery resource not being in two adjacent staging areas ($\lambda_{ia}+\lambda_{ib}=1$, where a∈[0, k−1]; b∈[0, a+1], ∀ i delivery resources).

Figure 8:
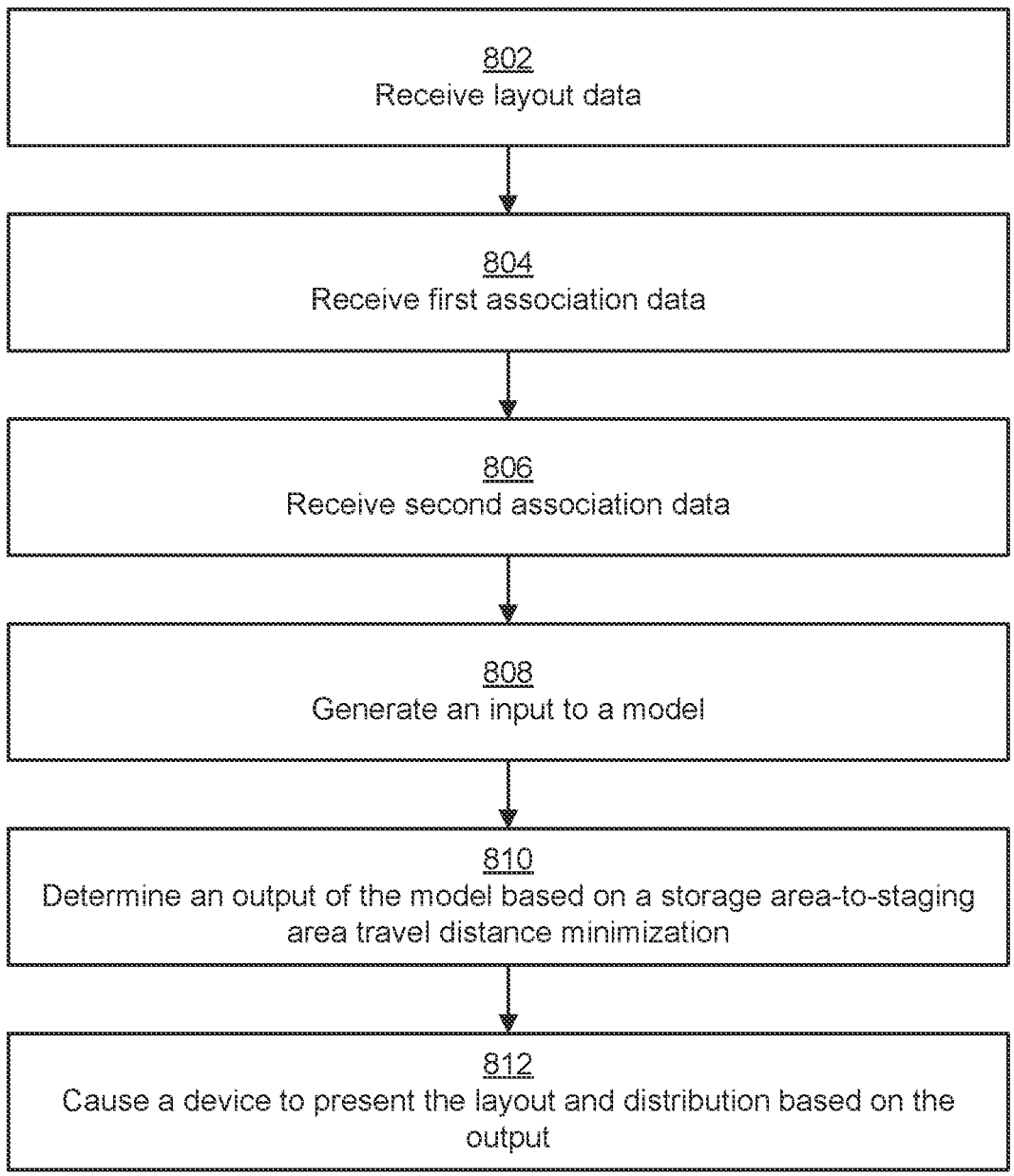
FIG. 8 illustrates an example of a flow for resource utilization based-modeling of a facility according to some embodiments of the present disclosure.
Figure 9:
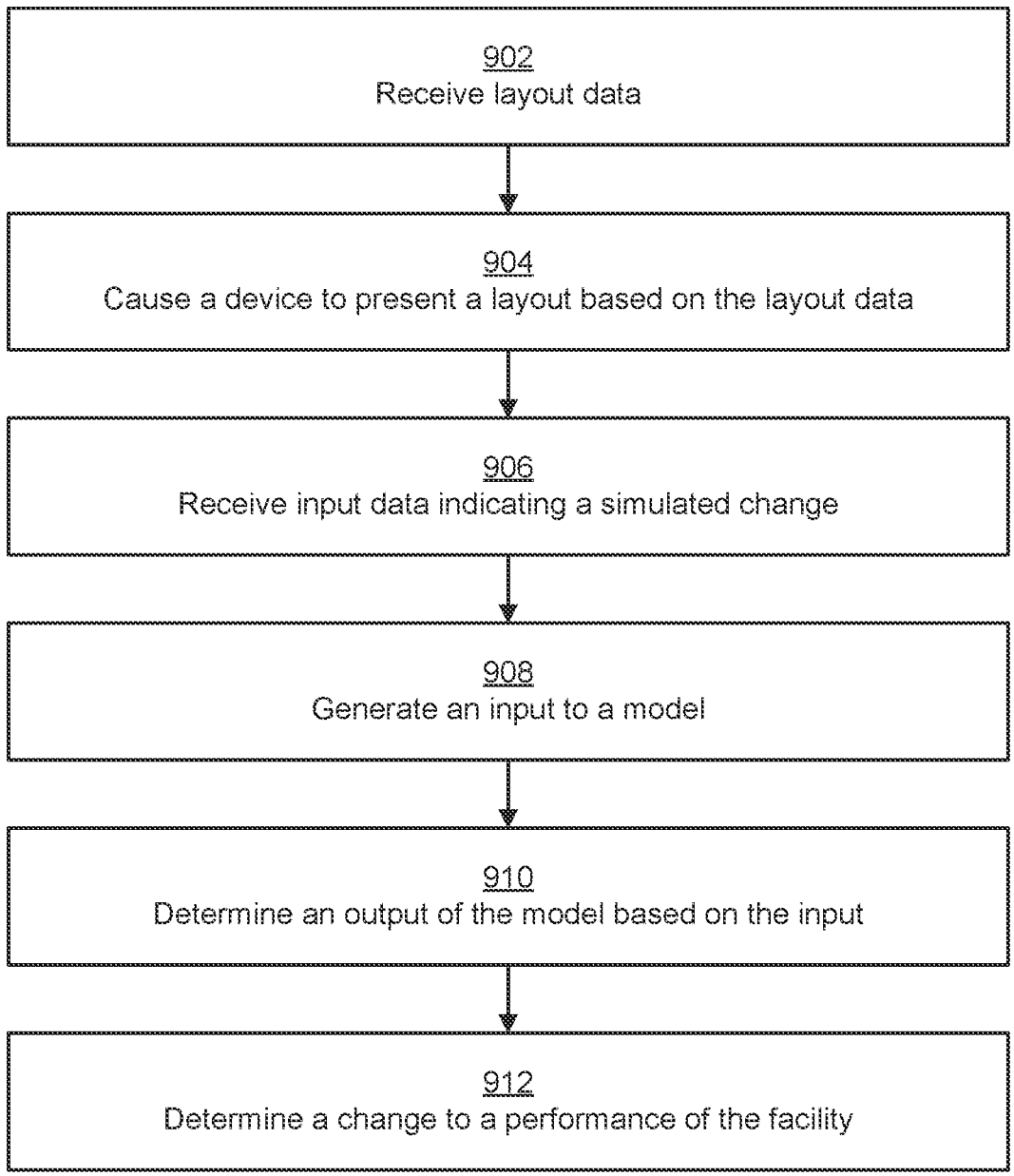
FIG. 9 illustrates an example of a flow for simulating a change to a layout of a facility according to some embodiments of the present disclosure.
Figure 10:
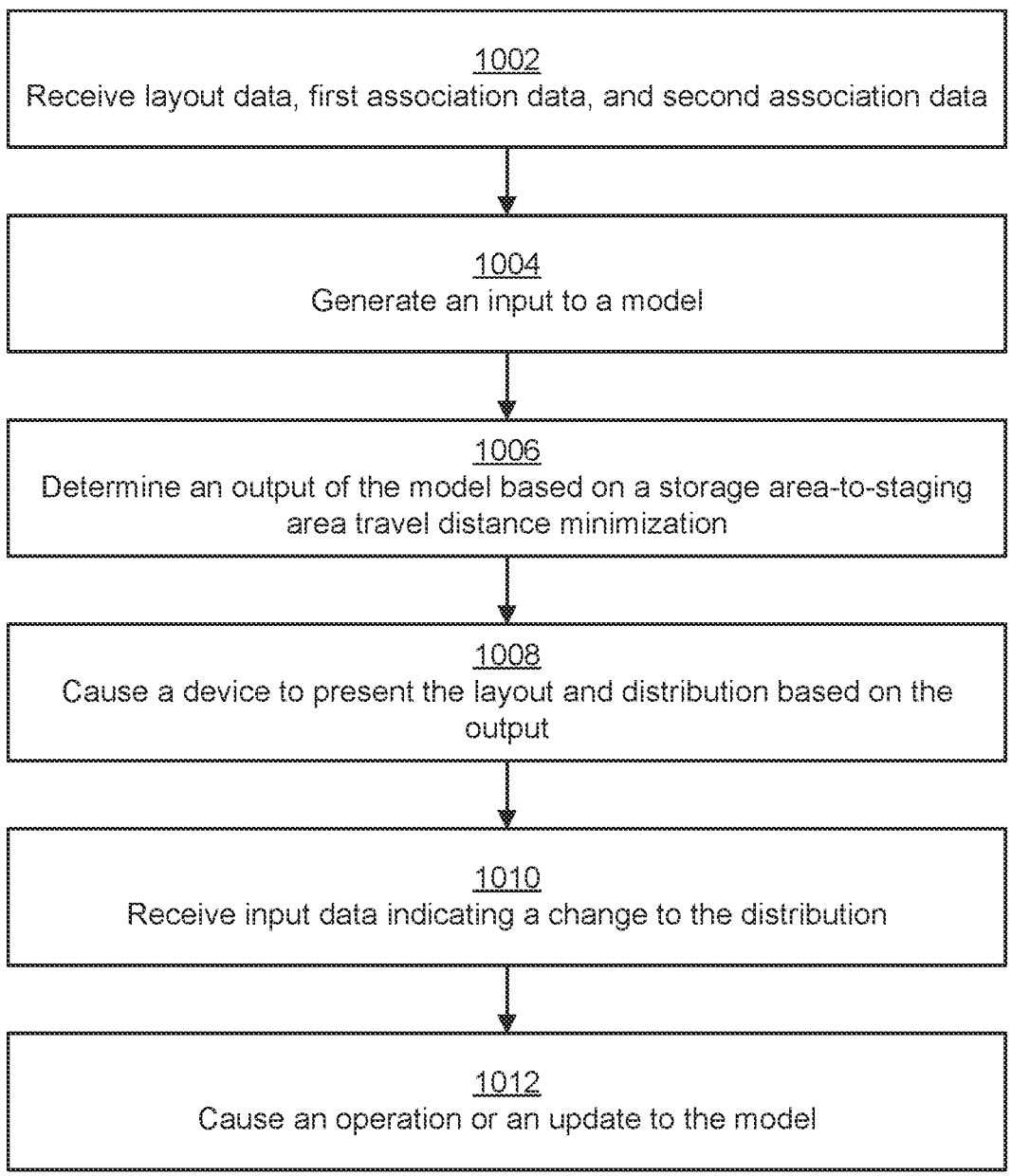
FIG. 10 illustrates an example of a flow for simulating a change to a layout of a facility according to some embodiments of the present disclosure.

FIGS. 8-10 illustrate examples of flows for aspects of the present disclosure. Operations of the flows can be performed by a computer system, such as the computer system 120. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 8 illustrates an example of a flow for resource utilization based-modeling of a facility according to some embodiments of the present disclosure. In an example, the flow includes operation 802, where the computer system receives layout data of a facility. The layout data indicates a layout of storage areas, staging areas, and material handling equipment for moving items to the storage areas. Each storage area can include a grid of storage spaces for storing items.

In an example, the flow includes operation 804, where the computer system receives first association data. The first association data indicates staging area-to-deliver resource associations. Each delivery resource may be associated with only one staging area. But, a staging area may be associated with multiple delivery resources.

In an example, the flow includes operation 806, where the computer system receives second association data. The second association data indicates item-to-delivery resource associations corresponding to items to be delivered. An item may be a package or a set of packages grouped together in a bag or container.

In an example, the flow includes operation 808, where the computer system generates an input to a model. The input can include the layout data, the first association data, and the second association data. The input may additionally include other data such as area data, priority data, or cycle data.

In an example, the flow includes operation 810, where the computer system determines an output of the model based on a storage area-to-staging area travel distance minimization. The output indicates a distribution of the items across the storage areas. The distribution includes a per item allocation to a storage space. In some instances, the model may be a mixed linear integer programming model, as described in FIG. 7.

In an example, the flow includes operation 812, where the computer system causes a device to present the layout and distribution based on the output. The layout and the distribution can be presented in a user interface of the device. The user interface may present indications of staging areas associated with delivery resources, portions of staging areas that store items or is associated with a staging area, and that a particular item is to be stored in a particular storage space. The computer system may additionally cause a deployment of facility resources to move items from material handling equipment to the storage areas and from the storage areas to the staging areas based on the output.

FIG. 9 illustrates an example of a flow for simulating a change to a layout of a facility according to some embodiments of the present disclosure. In an example, the flow includes operation 902, where the computer system receives layout data. The layout data can indicate a layout of storage areas, staging areas, and material handling equipment for moving items to the storage areas of a facility. Each storage area can include a grid of storage spaces for storing items.

In an example, the flow includes operation 904, where the computer system causes a device to present a layout based on the layout data. The device can present the layout in a user interface.

In an example, the flow includes operation 906, where the computer system receives input data indicating a simulated change. The simulated change may be a change to the layout, a total number of items to be stored, or a type of items to be stored.

In an example, the flow includes operation 908, where the computer system generates an input to a model. The input to the model can include the layout data, staging area-to-delivery resource associations, and item to-delivery resource associations based on the input data.

In an example, the flow includes operation 910, where the computer system determines an output of the model based on the input. The output of the model can be based on a storage area-to-staging area travel distance minimization. The output can indicate a distribution of the items across the storage areas. The distribution includes a per item allocation to a storage space.

In an example, the flow includes operation 912, where the computer system determines a change to a performance of the facility. The change may be a change to a pick rate, stow rate, stage rate, overall throughput, etc. for the facility. The determination may be based on a comparison of a prior performance of the facility to the performance of the facility with the simulated change.

FIG. 10 illustrates an example of a flow for simulating a change to a layout of a facility according to some embodiments of the present disclosure. In an example, the flow includes operation 1002, where the computer system receives layout data, first association data, and second association data. The layout data indicates a layout of storage areas, staging areas, and material handling equipment for moving items to the storage areas. Each storage area can include a grid of storage spaces for storing items. The first association data indicates staging area-to-deliver resource associations. Each delivery resource may be associated with only one staging area. But, a staging area may be associated with multiple delivery resources. The second association data indicates item-to-delivery resource associations corresponding to items to be delivered. An item may be a package or a set of packages grouped together in a bag or container.

In an example, the flow includes operation 1004, where the computer system generates an input to a model. The input can include the layout data, the first association data, and the second association data. The input may additionally include other data such as area data, priority data, or cycle data.

In an example, the flow includes operation 1006, where the computer system determines an output of the model based on a storage area-to-staging area travel distance minimization. The output indicates a distribution of the items across the storage areas. The distribution includes a per item allocation to a storage space.

In an example, the flow includes operation 1008, where the computer system causes a device to present the layout and distribution based on the output. The layout and the distribution can be presented in a user interface of the device. The user interface may present indications of staging areas associated with delivery resources, portions of staging areas that store items or is associated with a staging area, and that a particular item is to be stored in a particular storage space. The computer system may additionally cause a deployment of facility resources to move items from material handling equipment to the storage areas and from the storage areas to the staging areas based on the output.

In an example, the flow includes operation 1010, where the computer system receives input data indicating a change to the distribution. The change to the distribution may be received via the user interface of the device and indicate a re-allocation of some of the items to other storage spaces.

In an example, the flow includes operation 1012, where the computer system causes an operation or an update to the model. The computer system may cause an operation of material handling equipment based on the change. Or, the computer system may cause an operation of a facility resource to move an item from material handling equipment to a storage space within a storage area based on the change. The update to the model may involve a change to constraints, inputs, a cost function, or a retraining of the model. The updated model may then be used for subsequent determinations of resource utilization for the facility.

Figure 11:
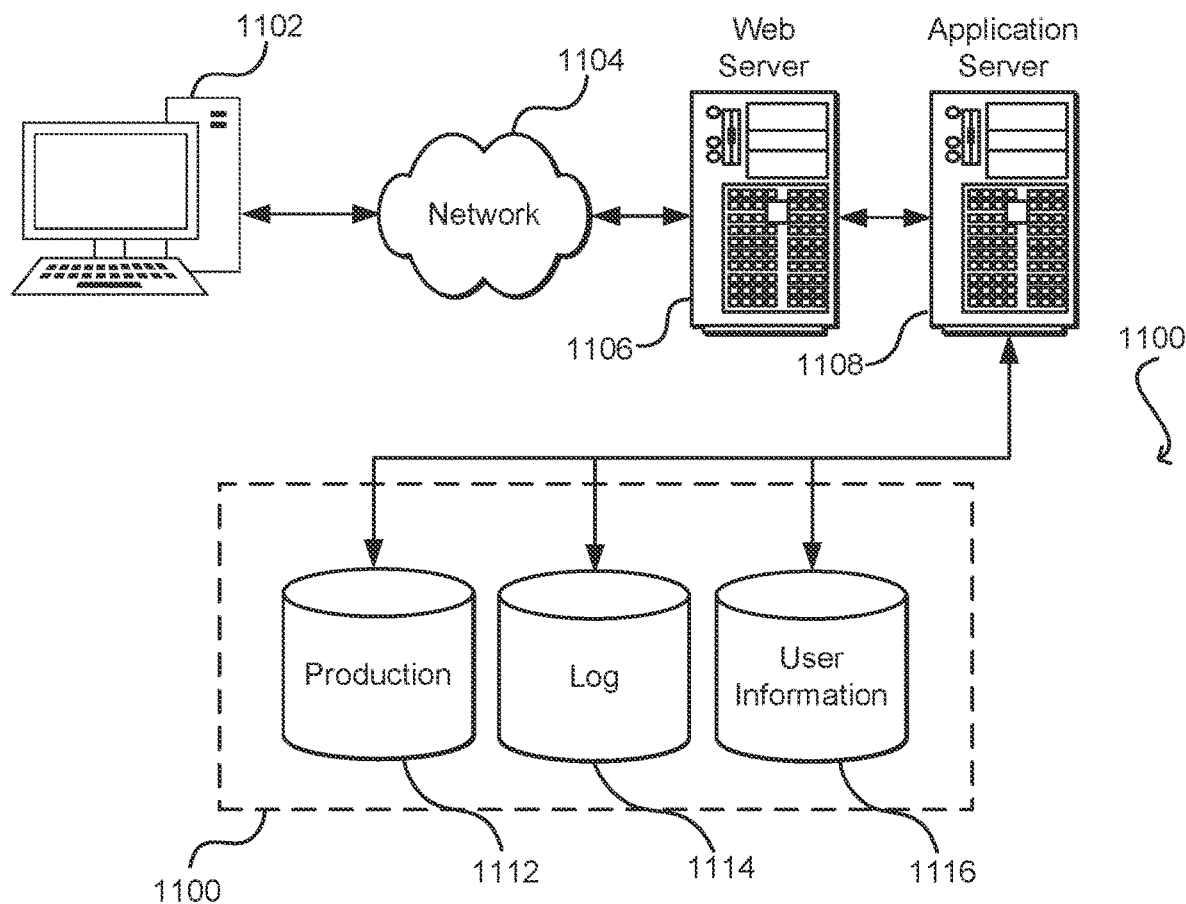
FIG. 11 illustrates an environment in which various features can be implemented, in accordance with at least one embodiment.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   a plurality of storage areas within a facility, wherein a storage area includes a plurality of storage spaces;
   a plurality of conveyor belts distributed between the plurality of storage areas such that a conveyor belt is positioned between a pair of storage areas;
   a plurality of staging areas within the facility, wherein a staging area is associated with a delivery resource and is configured to receive a set of items stored in one or more of the plurality of storage areas to be delivered by the delivery resource; and
   a computer system comprising one or more processors and one or more memory storing instructions that, upon execution by the one or more processors, configure the computer system to:
     receive layout data indicating a layout of the plurality of storage areas, the plurality of conveyor belts, and the plurality of staging areas;
     cause a device to present, in a user interface, the layout based at least in part on the layout data;
     receive first association data indicating staging area-to-delivery resource associations and including a first association, the first association indicating that a first staging area downstream from a first storage area is to be served using a first delivery resource;

receive second association data indicating item-to-delivery resource associations corresponding to items to be delivered and including a second association, the second association indicating that a first item stored in a first storage area is to be delivered using the first delivery resource;

generate an input to a model based at least in part on the layout data, the first association data, and the second association data;

determine an output of the model based at least in part on the input, wherein the output is generated by the model based at least in part on a storage area-to staging area travel distance minimization, and wherein the output indicates a distribution of the items across the plurality of storage areas, and wherein the distribution includes a per item allocation to a storage space; and cause the device to present, in the user interface, an update to the layout based at least in part on the output, the update indicating the distribution, control, based at least in part on the output, operations of robots deployed in the facility to move the items from the plurality of conveyor belts to the plurality of storage areas and from the plurality of storage areas to the plurality of staging areas.

2. The system of claim 1, wherein the one or more memory store instructions that, upon execution by the one or more processors, configure the computer system to:

receive, from the device, priority data via the user interface indicating a priority of using a shelf within a storage area, wherein input to the model is further generated based at least in part on the priority data.

3. The system of claim 1, wherein the one or more memory store instructions that, upon execution by the one or more processors, configure the computer system to:

receive, from the device, area data via the user interface indicating an area density of facility resources, wherein input to the model is further generated based at least in part on the area data.

4. The system of claim 1, wherein the output is generated by the model further based at least in part on a stage rate indicating a throughput of using the plurality of staging areas.

5. A computer-implemented method comprising:

receiving layout data indicating a layout of a plurality of storage areas, a plurality of staging areas, and a plurality of material handling equipment configured to move items to at least the plurality of storage areas;

receiving first association data indicating staging area-to-delivery resource associations and including a first association, the first association indicating that a first staging area downstream from a first storage area is to be served using a first delivery resource;

receiving second association data indicating item-to-delivery resource associations corresponding to items to be delivered and including a second association, the second association indicating that a first item stored in a first storage area is to be delivered using the first delivery resource;

generating an input to a model based at least in part on the layout data, the first association data, and the second association data;

determining an output of the model based at least in part on the input, wherein the output is generated by the model based at least in part on a storage area-to staging area travel distance minimization, and wherein the output indicates a distribution of the items across the plurality of storage areas; and controlling, based at least in part on the output, an operation of an automated vehicle deployed to move the first item between the material handling equipment and the first storage area or between the first storage area and the first staging area.

6. The computer-implemented method of claim 5, further comprising:

determining, based at least in part on the output, that a staging area is associated with a delivery resource and that a portion of a storage area is to store first items associated with at least one of the staging area or the delivery resource; and causing a device to present, on the layout in a user interface, a first indication that the staging area is associated with the delivery resource and a second indication that the portion of the storage area is to store the first items or is associated with at least one of the staging area or the delivery resource.

7. The computer-implemented method of claim 6, further comprising:

determining, based at least in part on the output, that a first item of the first items is to be stored in a storage space of the staging area; and causing a device to present, on the layout in a user interface, a third indication that the first item is to be stored in the storage space.

8. The computer-implemented method of claim 5, further comprising:

receiving, from a device, input data via a user interface indicating a change to the distribution; and causing an operation of one of the plurality of material handling equipment based at least in part on the change.

9. The computer-implemented method of claim 5, further comprising:

receiving, from a device, input data via a user interface indicating a change to the distribution; and causing an operation of a facility resource to move an item from one of the plurality of material handling equipment to a storage space within a storage area of the plurality of storage areas based at least in part on the change.

10. The computer-implemented method of claim 5, further comprising:

receiving, from a device, input data via a user interface indicating a change to the distribution; and generating an update to the model based at least in part on the change.

11. The computer-implemented method of claim 5, further comprising:

causing, based at least in part on the output, an operation of one of the plurality of material handling equipment or an operation of a facility resource to move an item from the one of the material handling equipment to a storage area of the plurality of storage areas or from the storage area to a staging area of the plurality of staging areas.

12. The computer-implemented method of claim 5, further comprising:

generating, based at least in part on the output, a deployment plan of facility resources configured to move the items from the plurality of storage areas to the plurality of stating areas; and causing a deployment of the facility resources based at least in part on the deployment plan.

13. The computer-implemented method of claim 5, wherein the layout is associated with a storage facility, and wherein the computer-implemented method further comprises:

receiving, from a device, input data via a user interface indicating a simulated change to the layout, a total number of items to be stored, or a type of items to be stored;

generating second input to the model based at least in part on the input data;

determining a second output of the model based at least in part on the second input; and determining, based at least in part on the output, a change to a performance of the storage facility.

14. One or more non-transitory computer-readable storage media storing instructions that, upon execution on a system, cause the system to perform operations comprising:

receiving layout data indicating a layout of a plurality of storage areas, a plurality of staging areas, and a plurality of material handling equipment configured to move items to at least the plurality of storage areas;

receiving first association data indicating staging area-to-delivery resource associations and including a first association, the first association indicating that a first staging area downstream from a first storage area is to be served using a first delivery resource;

receiving second association data indicating item-to-delivery resource associations corresponding to items to be delivered and including a second association, the second association indicating that a first item stored in a first storage area is to be delivered using the first delivery resource;

generating an input to a model based at least in part on the layout data, the first association data, and the second association data;

determining an output of the model based at least in part on the input, wherein the output is generated by the model based at least in part on a storage area-to staging area travel distance minimization, and wherein the output indicates a distribution of the items across the plurality of storage areas; and controlling, based at least in part on the output, an operation of an automated vehicle deployed to move the first item between the material handling equipment and the first storage area or between the first storage area and the first staging area.

15. The one or more non-transitory computer-readable storage media of claim 14 storing additional instructions that, upon execution on the system, cause the system to perform additional operations comprising:

providing the input to the model, wherein the model includes a mixed linear integer programming model configured to minimize a total travel distance associated with moving the items from the plurality of storage areas to the plurality of staging areas.

16. The one or more non-transitory computer-readable storage media of claim 14 storing additional instructions that, upon execution on the system, cause the system to perform additional operations comprising:

providing the input to the model, wherein the model is further configured to increase a stow rate, increase a pick rate, balance a density of items across the plurality of storage areas, prevent item overflows, or reduce a number of used material handling equipment or used storage areas.

17. The one or more non-transitory computer-readable storage media of claim 14 storing additional instructions that, upon execution on the system, cause the system to perform additional operations comprising:

including in the input, based at least in part on the layout data, a number of available material handling equipment, a capacity per available material handling equipment, a number of available staging areas, a capacity per available staging area, or a travel distance between one of the material handling equipment and one of the plurality of staging areas.

18. The one or more non-transitory computer-readable storage media of claim 14 storing additional instructions that, upon execution on the system, cause the system to perform additional operations comprising:

including in the input, based at least in part on the first association data and the second association data, an association between a package and an item to contain one or more packages, an association between the item and a delivery resource, or a number of items associated with the delivery resource.

19. The one or more non-transitory computer-readable storage media of claim 14 storing additional instructions that, upon execution on the system, cause the system to perform additional operations comprising:

determining a set of constraints including a volume constraint, a number of items to be handled by one of the plurality of material handling equipment, a grouping of aisles across storage areas, or an area density of facility resources, wherein the output is generated further based at least in part on the set of constraints.

20. The one or more non-transitory computer-readable storage media of claim 14 storing additional instructions that, upon execution on the system, cause the system to perform additional operations comprising:

determining model data indicating at least one of an item type, a delivery resource, a delivery vehicle type, or a staging area, wherein the output is generated further based at least in part on the model data.

* * * * *